(12) United States Patent
Lee et al.

(10) Patent No.: US 7,991,192 B2
(45) Date of Patent: Aug. 2, 2011

(54) METHOD OF TRACKING A MOVING OBJECT BY AN EMISSIVITY OF THE MOVING OBJECT

(75) Inventors: Harry C. Lee, Maitland, FL (US); Dat Nguyen, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 2333 days.

(21) Appl. No.: 10/304,913

(22) Filed: Nov. 27, 2002

(65) Prior Publication Data
US 2007/0092109 A1    Apr. 26, 2007

(51) Int. Cl.
G06K 9/00    (2006.01)
(52) U.S. Cl. .................. 382/103; 250/203.1
(58) Field of Classification Search .................. 382/103; 250/203.1, 203.6, 202; 356/28; 244/3.11–3.16
See application file for complete search history.

(56) References Cited

U.S. PATENT DOCUMENTS

| | | | |
|---|---|---|---|
| 4,038,547 A | 7/1977 | Hoesterey | |
| 4,383,663 A * | 5/1983 | Nichols | 244/3.16 |
| 4,490,851 A | 12/1984 | Gerhart et al. | |
| 4,739,401 A | 4/1988 | Sacks et al. | |
| H881 H | 1/1991 | Holt | |
| 5,027,413 A | 6/1991 | Barnard | |
| 5,109,435 A | 4/1992 | Lo et al. | |
| 5,147,088 A | 9/1992 | Smith et al. | |
| 5,332,176 A * | 7/1994 | Wootton et al. | 244/3.11 |
| 5,428,221 A | 6/1995 | Bushman | |
| 5,430,809 A | 7/1995 | Tomitaka | |
| 5,455,587 A | 10/1995 | Schneider | |
| 5,479,255 A | 12/1995 | Denny et al. | |
| 5,574,498 A | 11/1996 | Sakamoto et al. | |
| 5,612,928 A | 3/1997 | Haley et al. | |
| 5,751,830 A | 5/1998 | Hutchinson | |
| 5,793,889 A | 8/1998 | Bushman | |
| 5,812,193 A | 9/1998 | Tomitaka et al. | |
| 5,828,334 A | 10/1998 | Deegan | |
| 5,850,285 A | 12/1998 | Hill, Jr. et al. | |
| 5,912,980 A | 6/1999 | Hunke | |
| 5,960,097 A | 9/1999 | Pfeiffer et al. | |
| 5,999,652 A | 12/1999 | Bushman | |
| 6,079,665 A | 6/2000 | Nella et al. | |
| 6,088,469 A | 7/2000 | Fukumura et al. | |
| 6,104,429 A | 8/2000 | Thurman | |
| 6,265,704 B1 * | 7/2001 | Livingston | 250/203.2 |

* cited by examiner

*Primary Examiner* — Isam Alsomiri
(74) *Attorney, Agent, or Firm* — Buchanan Ingersoll & Rooney PC

(57) ABSTRACT

A method of tracking a moving object by an emissivity of the moving object including receiving first frame data containing emissivity image data of an emissivity from the moving object within a scene, extracting characterization image data from the first frame data that represents edges and gradients of the emissivity, and analyzing the characterization image data for tracking information.

18 Claims, 2 Drawing Sheets

METHOD OF TRACKING A MOVING OBJECT BY AN EMISSIVITY OF THE MOVING OBJECT

CROSS-REFERENCE TO RELATED APPLICATIONS

Attention is directed to related U.S. application Ser. No. 10/305,163, entitled "A METHOD FOR IDENTIFYING AN EMISSIVITY FROM A MOVING OBJECT", of Jason Sefcik and Harry Lee, filed on even date herewith, the disclosure of which is hereby incorporated by reference in its entirety.

BACKGROUND OF THE INVENTION

1. Field of the Invention

The present invention relates to tracking a moving object, and in particular, to a method of tracking a moving object by an emissivity from the moving object.

2. Background Information

It is often desired track a moving object. To track a moving object, such as a missile, the object or an indicator of the object is detected repeatedly or constantly to collect tracking information. For example, U.S. Pat. No. 5,793,889, "Plume or Combustion Detection by Time Sequence Differentiation" discloses a method for detecting a missile exhaust plume using an image differencing strategy. U.S. Pat. No. 5,960,097, "Background Adaptive Target Detection and Tracking with Multiple Observation and Processing Stages" discloses a system to collect and process data samples from a focal plane assembly that also uses an image differencing strategy. U.S. Pat. No. 5,850,285 "Advanced Missile Approach Warning System (AMAWS) and Stealth (Low Observables) Detection Based on Exploitation of Quantum Effects" discloses a method for analyzing the quantum effects related to stimulated emission for detection of aircraft or missiles and looks at the electromagnetic radiation associated with the presence of certain chemical compounds that exist in the exhaust plume of an aircraft or missile. The disclosures of these patents are hereby incorporated by reference in their entireties.

SUMMARY OF THE INVENTION

The present invention is directed to a method of tracking a moving object by an emissivity of the moving object including receiving a first frame containing emissivity image data of an emissivity from the moving object within a scene, extracting characterization image data from the first frame representing edges of the emissivity within the first frame, and analyzing the characterized image data for tracking information.

The present invention is also directed to a method of tracking a moving object by an emissivity of the moving object including receiving first frame data containing emissivity image data of an emissivity from the moving object within a scene, extracting characterization image data from the first frame data that represents characteristics of the emissivity, and analyzing the characterization image data for tracking information by determining a dimension of the emissivity within the characterization image data.

BRIEF DESCRIPTION OF THE DRAWINGS

Other objects and advantages of the present invention will become apparent to those skilled in the art upon reading the following detailed description of exemplary embodiments, in conjunction with the drawings of the exemplary embodiments, wherein:

FIG. 2b is a representation of characterization image data for an emissivity from the frame data of the capture window in FIG. 2a.

FIG. 3a is a representation of a capture window from scene image data of a missile later in the flight profile of the missile shown in FIG. 2a.

FIG. 3b is a representation of characterization image data for an emissivity from the frame data of the capture window in FIG. 3a.

DETAILED DESCRIPTION OF THE PREFERRED EMBODIMENT

Figure 1:
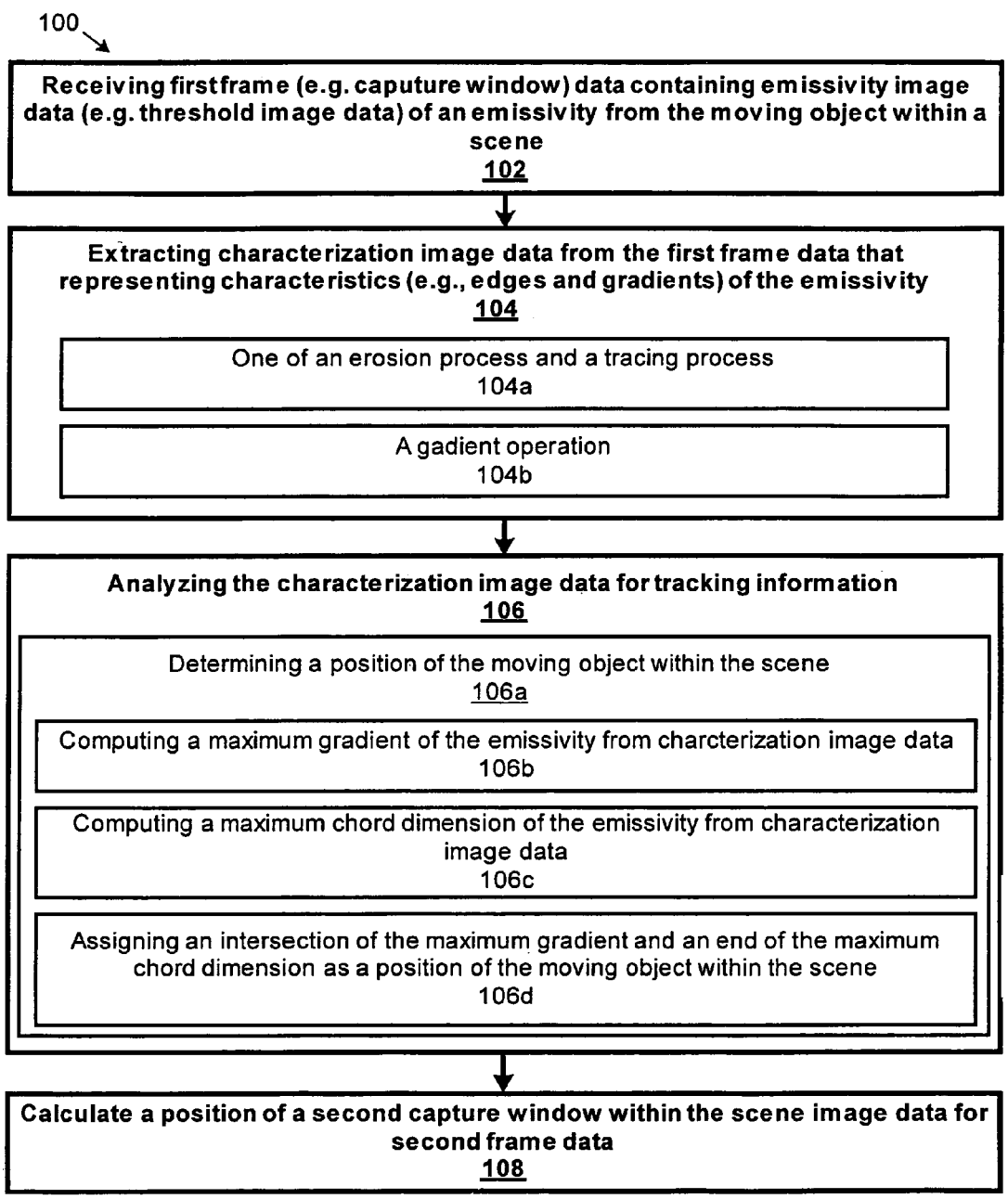
FIG. 1 is a block diagram of an exemplary embodiment for tracking a moving object by an emissivity of the moving object.

FIG. 1 is a block diagram 100 of an exemplary method for tracking a moving object by an emissivity of the moving object. The method, as shown in FIG. 1, includes the step of receiving first frame data containing emissivity image data of an emissivity from the moving object within a scene 102. The frame data containing emissivity image data of an emissivity from the moving object within a scene can be the entire scene image data for the scene.

In the alternative, the frame data can be from a capture window within the scene image data for the scene to minimize image processing. The position of the capture window within the scene image data for detecting the emissivity can be from inertial flight information from the moving object or from other previous tracking information that can be used as a basis to determine where the moving object will be in the scene. For example, the position of a capture window can be based upon analysis of at least two earlier samplings of the entire scene image data in which the profile of the moving object was tracked. Another example is that the position of the capture window is based upon analysis of an earlier sampling and inertial flight information from the moving object. The position of the capture window can be based just upon the inertial flight information from the moving object given a large enough capture window is used to account for possible margins of error in the inertial flight information in relation to the perspective of the scene.

The first frame data containing emissivity image data of an emissivity from the moving object can be from a binary (e.g., infrared) or color camera. The first frame data from an infrared camera will typically be binary image data that is representative of the emissivity from the moving object. In the case of a color camera, the image data from the camera is converted to binary image data through a thresholding technique to obtain first frame data of an emissivity image data representative of the emissivity from the moving object. For example, an average background image is measured at the center of the scene within a 64 pixel by 64 pixel region. This measurement serves as a comparative baseline for subsequent image processing in that pixels measured as being more than 1.3 times the average background image is determined to be the emissivity of the moving object. Those skilled in the art will realize that different size regions, and/or different techniques, other than averaging, (e.g. median based techniques) can be used without departing from the spirit and scope of the present invention. In addition, clutter suppression techniques can be used to remove any undesired data (e.g., interlaced data) from the first frame data.

The moving object, for example, can be a missile launched from a launcher near which the camera is positioned. A missile traverses three main sequences or phases during a given flight profile. The initial phase is a whiteout phase, followed by the boost phase and the cruise phase. The whiteout phase occurs at the launch, during which time the entire scene including the missile is saturated by plume exhaust brightness and, generally speaking, no other features other than the fact that the whiteout has occurred can be discerned from the scene. The boost phase is when the missile is somewhat down range flying under the power of a first stage rocket booster and the exhaust plume from the first stage rocket booster can be discerned from the background imagery. The cruise phase is when the first stage rocket booster is expended and a subsequent, smaller stage booster is ignited. In the cruise phase, the intensity and size of the exhaust plume is significantly reduced. The first frame data can represent an emissivity from the missile during any stage or phase of the missile flight profile.

The emissivity of an object is the light or the relationship of colors generated by the objected. For example, the combustion plume of a missile in which the propellant of the missile is burning just outside of the missile nozzle has a light signature that is brighter and/or distinctive from direct or reflected natural light. The emissivity of the combustion plume from a missile is a function of the propellant used by the missile. Depending on the chemical composition or make up of a missile's propellant, the combustion plume of the missile will have a light signature in terms of intensity that can be detected by both a binary and color camera, or in terms of a relationship of colors that can be detected by a color camera. Likewise, combustion plumes exiting from jet engines or gas turbines, if visible, will have a light signature that can be detected. Further, other light signatures for other types of combustion (e.g. artillery) can also be detected.

As shown in FIG. 1, the next step in the method 100 is extracting characterization image data from the first frame data that represents characteristics (e.g., edges and gradients) of the emissivity 104. Extracting characterization image data can include one of an erosion or tracing process 104a, and a gradient operation 104b. A gradient operation measures the gradients of images in two orthogonal directions within the frame data. A gradient shows the change in spatial and temporal intensities within the frame data. Techniques such as finite differences and polynomial fitting, or any other desired technique, can be used to determine image gradients. Some examples of common gradient operations are Prewitt, Sobel and Isotropic. These operators compute horizontal and vertical differences of local sums.

The edges of an emissivity within frame data can be found by either traversing the edges of the emissivity (i.e., tracing), or by growing the emissivity region by one pixel to an expanded region and subtracting the emissivity region from the expanded region (i.e., erosion), or using any known technique. For example, a tracing process can be used that has an algorithm, which starts from the center of the frame data, and walks or works its way toward the edge of frame data. Once a boundary pixel of the emissivity is hit or encountered during the algorithm's processing, this pixel is marked as a start pixel and the border of the ellipse is traversed until the start pixel is reached. In another example, an erosion process can be performed on the emissivity image within a thresholded frame data and the resulting image subtracted from the thresholded frame data. In both of these examples, the result is characterization image data which contains an edge outline of the emissivity. To reduce image processing, the gradient operation 104b can only be done near the edge outline of the emissivity, since this will be the area of interest.

As shown in FIG. 1, the characterization image data is analyzed for tracking information 106. Analyzing the characterization image data for tracking information 106 can include determining a position of the moving object within the scene 106a. For example, the position of the moving object within the scene can be determined based on the position of the frame data being known and the position of the moving object in relation to the emissivity of the moving object. In the case of a missile, the missile is near an intersection of a maximum gradient and a point of the maximum chord of an ellipse that outlines the outside edge of the missile combustion plume (i.e., emissivity).

The maximum gradient for the emissivity is computed from the characterization image 106a. In addition, the maximum chord dimension of the emissivity is computed from the characterization image data 106b. The maximum chord dimension of the emissivity is computed as a distance between points on the edges of the emissivity within the characterization image data that are a maximum distance away from each other. The chord of the emissivity is found by using the equation:

$$d_{ij}^2 = (x_i - x_j)^2 + (y_i - y_j)^2$$

The maximum chord dimension $\text{Max}_{ij}(d_{ij}^2)$ is where $(x_i, y_i)$ and $(x_j, y_j)$ are the two points on the edge of the emissivity that are the farthest from one another. The maximum chord dimension can be found by comparative calculation for sets of points along the edge of the emissivity. Another way of finding a maximum chord dimension is to use a least squares approximation.

The intersection of the maximum gradient and an end of the maximum chord dimension is assigned as the position of the moving object within the scene 106d. The chord of the emissivity is in effect a line that corresponds to the main thrust line produced by the propulsive system of a missile or other such combustion plume producing device. The phase of the missile (i.e., cruise or boost) must be account for in tracking a missile because of the difference in size of the combustion plume of a missile in a boost phase (i.e., large) as opposed to the combustion plume of missile in the cruise phase (i.e., smaller).

As shown in FIG. 1, the next step in the exemplary embodiment 100 can be to calculate a position of a second capture window within the scene image data 108. For example, the position of missile can be determined in a plurality of frames to calculate missile velocity. Before moving on to the next image frame, the velocity and acceleration of the missile can be determined, along with any other desired characteristics. The velocity/acceleration parameters can be determined by chord position analysis from frame to frame. The missile trajectory is indicated by the movement of the chord position from frame to frame in concert with velocity/acceleration parameters. These parameters can be used to estimate the location of the next capture window. The location of the next frame will be based on a projection of where the chord of the combustion plume will be after moving with a known velocity and acceleration (the velocity and acceleration calculated in the previous frame). Because the combustion plume becomes smaller as the missile moves away, a smaller capture window can be used. Of course, when the missile is moving closer, a larger capture window should be used. Based on a previous position of the missile and the velocity/acceleration of the missile (i.e., chord position analysis), the position and size of the next capture window can be determined.

Figure 2A:
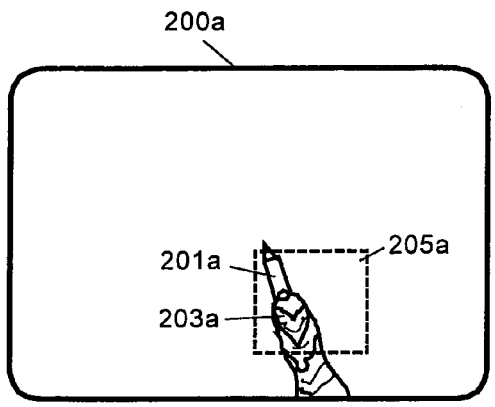
FIG. 2a is a representation of a capture window from scene image data of a missile during a flight profile, of the missile.
Figure 3A:
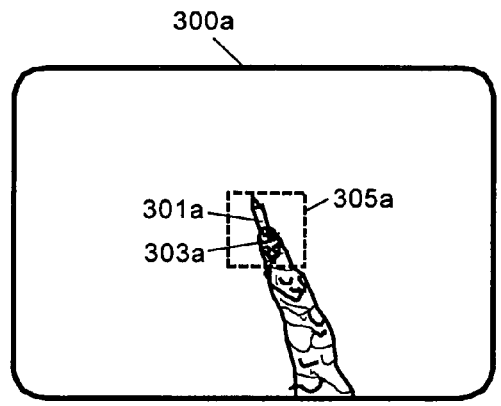
Figure 2B:
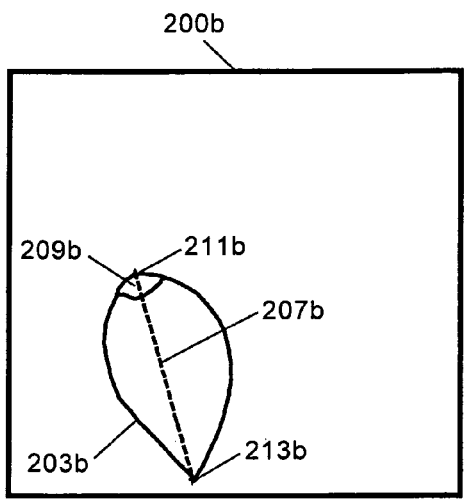
Figure 3B:
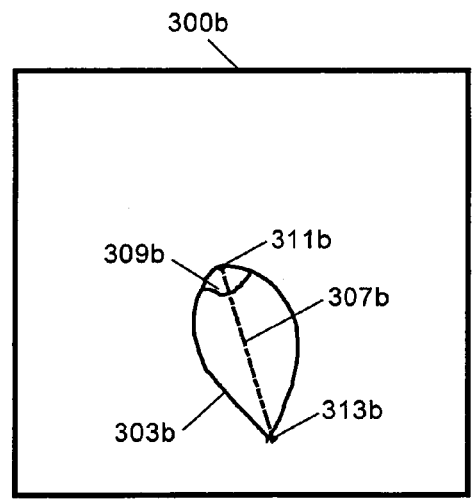

FIG. 2a is a representation of a capture window from scene image data of a missile during a flight profile of a missile. A scene 200a contains a missile 201a with a combustion plume 203a having an emissivity. A capture window 205a based on computations from a previous frame, inertial flight information of the missile or combination thereof is centered on an area of the scene where the source of the emissivity is projected to be. The characterization image data is extracted from the frame data of the capture window and results in a characterization image 200b, as shown in FIG. 2b. The characterization image 200b has an edges of the emissivity 203b from which the maximum chord dimension 207b can be found. Since the position of the capture window 205a within the scene is known and the position of the missile can be determined by the intersection of a maximum gradient 209b and a point 211b of the maximum chord of the outside edges 203b of the missile combustion plume. The tracking information from the frame data of the capture window 205a in FIG. 2a is used to calculate a position of a second capture window within the scene image data for second frame data later in the flight profile of the missile. As shown in FIG. 3a, a scene 300a later in the flight profile contains the missile 301a with a combustion plume 303a having an emissivity. The characterization image data is extracted from the frame data of the capture window and results in a characterization image 300b, as shown in FIG. 3b. The characterization image 300b has edges of the emissivity 303b from which the maximum chord dimension 307b can be found. Since the position of the capture window 305a within the scene is known, the position of the missile can be determined by the intersection of a maximum gradient 309b and a point 311b of the maximum chord of the outside edges 303b of the missile combustion plume.

In effect, the method can be an iterative process that is initiated by an initial capture window by using the initial inertial flight information of the missile. This iterative process tracks the missile throughout its flight profile. This iterative process can be used in conjunction with a Kalman filter to track the missile. In addition, a communication link an be established with the missile to control the missile throughout the flight profile.

The present invention has been described with reference to preferred embodiments. However, it will be readily apparent to those skilled in the art that it is possible to embody the invention in specific forms other than that described above, and that this may be done without departing from the spirit of the invention. The preferred embodiments are merely illustrative and should not be considered restrictive in any way. The scope of the invention is given by the appended claims, rather than the preceding description, and all variations and equivalents which fall within the range of claims are intended to be embraced therein.

The invention claimed is:

1. A method of tracking a moving object by an emissivity of the moving object comprising:
   receiving first frame data containing emissivity image data of an emissivity from the moving object within a scene;
   extracting characterization image data from the first frame data that represents edges and gradients of the emissivity, and
   analyzing the characterization image data for tracking information, wherein extracting characterization image data from the first frame data that represents edges and gradients of the emissivity includes an erosion process and a gradient operation.

2. The method according to claim 1 wherein the emissivity is a combustion plume of the moving object.

3. The method according to claim 1 wherein the first frame data is from a first capture window within scene image data for a scene containing the emissivity.

4. The method according to claim 3, wherein the position of the first capture window is determined using flight information from the moving object.

5. The method according to claim 1 wherein the first frame data contains thresholded image data of the emissivity.

6. The method according to claim 1 wherein analyzing the characterization image data for tracking information includes determining a dimension of the emissivity.

7. The method according to claim 6 wherein the dimension is a chord of the emissivity.

8. The method according to claim 1 wherein analyzing the characterized image data for tracking information includes determining a position of the moving object within the scene.

9. A method of tracking a moving object by an emissivity of the moving object comprising:
   receiving first frame data containing emissivity image data of an emissivity from the moving object within a scene;
   extracting characterization image data from the first frame data that represents edges and gradients of the emissivity, and
   analyzing the characterization image data for tracking information by determining a position of the moving object within the scene, wherein the determining includes:
   computing a maximum gradient of the emissivity;
   computing a maximum chord dimension of the emissivity; and
   assigning an intersection of the maximum gradient and an end of the maximum chord dimension as a position of the moving object within the scene.

10. The method according to claim 9 wherein extracting characterization image data from the first frame data that represents edges and gradients of the emissivity includes a tracing process and a gradient operation.

11. A method of tracking a moving object by an emissivity of the moving object comprising:
    receiving first frame data containing emissivity image data of an emissivity from the moving object within a scene, wherein the first frame data is from a first capture window within scene image data for a scene containing the emissivity;
    extracting characterization image data from the first frame data that represents edges and gradients of the emissivity, and
    analyzing the characterization image data for tracking information, wherein the tracking information is used to calculate a position of a second capture window within the scene image data for a second frame data containing emissivity image data.

12. The method according to claim 11 wherein the second capture window is different size than the first capture window.

13. A method of tracking a moving object by an emissivity of the moving object comprising:
    receiving first frame data containing emissivity image data of an emissivity from the moving object within a scene;
    extracting characterization image data from the first frame data that represents characteristics of the emissivity; and
    analyzing the characterization image data for tracking information by determining a dimension of the emissivity within the characterization image data, wherein extracting characterization image data from the first frame data that represents characteristics of the emissivity includes:
    a gradient operation; and
    one of an erosion process and a tracing process.

14. The method according to claim 13 wherein the emissivity is a combustion plume of the moving object.

15. The method according to claim 13, wherein the first frame data is from a first capture window within scene image data for a scene containing the emissivity.

16. The method according to claim 13 wherein analyzing the characterization image data for tracking information by determining a dimension of the emissivity within the characterization image data includes determining a position of the moving object within the scene.

17. A method of tracking a moving object by an emissivity of the moving object comprising:
   receiving first frame data containing emissivity image data of an emissivity from the moving object within a scene;
   extracting characterization image data from the first frame data that represents characteristics of the emissivity; and
   analyzing the characterization image data for tracking information by determining a dimension of the emissivity within the characterization image data and by determining a position of the moving object within the scene, wherein determining a position of the moving object within the scene includes:
   computing a maximum gradient of the emissivity;
   computing a maximum chord dimension of the emissivity; and
   assigning an intersection of the maximum gradient and an end of the maximum chord dimension as a position of the moving object within the scene.

18. A method of tracking a moving object by an emissivity of the moving object comprising:
   receiving first frame data containing emissivity image data of an emissivity from the moving object within a scene, wherein the first frame data is from a first capture window within scene image data for a scene containing the emissivity;
   extracting characterization image data from the first frame data that represents characteristics of the emissivity; and
   analyzing the characterization image data for tracking information by determining a dimension of the emissivity within the characterization image data, wherein the tracking information is used to calculate a position of a second capture window within the scene image data for a second frame data containing emissivity image data.

* * * * *